(12) United States Patent
Matsuda et al.

(10) Patent No.: US 10,352,281 B2
(45) Date of Patent: Jul. 16, 2019

(54) MANUFACTURING METHOD OF HEAD BOX OF MOTORCYCLE, AND AIR-INTAKE DEVICE OF MOTORCYCLE

(71) Applicant: Kawasaki Jukogyo Kabushiki Kaisha, Kobe-shi, Hyogo (JP)

(72) Inventors: Yoshimoto Matsuda, Kobe (JP); Daisuke Watanabe, Akashi (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 231 days.

(21) Appl. No.: 15/206,176

(22) Filed: Jul. 8, 2016

(65) Prior Publication Data

US 2018/0010558 A1 Jan. 11, 2018

(51) Int. Cl.
| | |
|---|---|
| *B60K 13/02* | (2006.01) |
| *B62K 11/00* | (2006.01) |
| *F02M 35/10* | (2006.01) |
| *B60K 13/06* | (2006.01) |
| *B62M 7/02* | (2006.01) |
| *B62K 11/04* | (2006.01) |
| *F02M 35/12* | (2006.01) |
| *F02M 35/04* | (2006.01) |

(52) U.S. Cl.
CPC ....... *F02M 35/10347* (2013.01); *B60K 13/02* (2013.01); *B60K 13/06* (2013.01); *B62K 11/00* (2013.01); *B62K 11/04* (2013.01); *B62M 7/02* (2013.01); *B60Y 2200/12* (2013.01); *B62K 2700/50* (2013.01); *F02M 35/048* (2013.01); *F02M 35/1266* (2013.01)

(58) Field of Classification Search
CPC .. B60K 13/02; B60K 13/06; F02M 35/10347; F02M 35/048; F02M 35/1266; B62K 11/00; B62K 11/02; B62K 11/04
USPC ...................................... 180/219, 28.3, 68.3
See application file for complete search history.

(56) References Cited

U.S. PATENT DOCUMENTS 7,264,072 B2 * 9/2007 Yoshikawa ............ F02M 35/04
123/184.21
7,331,322 B2 * 2/2008 Seki .................. F02M 35/10013
123/184.21

(Continued)

FOREIGN PATENT DOCUMENTS

| EP | 1083330 | * | 2/2000 | ............. F02M 35/16 |
| JP | 4490203 B2 | | 6/2010 | |

*Primary Examiner* — Anne Marie M Boehler
(74) *Attorney, Agent, or Firm* — Alleman Hall Creasman & Tuttle LLP

(57) ABSTRACT

An air-intake device comprises a vehicle body frame including a head box; and a pair of right and left main frames, wherein the head box includes: a casing section which extends between a front opening and a rear opening of the head box and is formed with a main air passage; and a pair of right and left extending sections coupled to the pair of main frames, respectively, wherein at least one extending section is provided with a branch air passage which branches from the main air passage, and wherein a separating wall is provided between the main air passage and the branch air passage and has a communication hole, and wherein when a vehicle body is viewed from a side, at least one extending section is extended rearward to a location at which at least a front region of the communication hole is covered by the extending section.

11 Claims, 11 Drawing Sheets

(56) References Cited

U.S. PATENT DOCUMENTS

| | | | |
|---|---|---|---|
| 2005/0051375 A1* | 3/2005 | Momosaki | F02M 35/10013 180/219 |
| 2009/0218152 A1* | 9/2009 | Oohashi | B60K 13/02 180/68.3 |
| 2011/0155492 A1* | 6/2011 | Matsuda | B60K 13/02 180/68.3 |
| 2015/0083513 A1* | 3/2015 | Ito | B60K 13/02 180/229 |
| 2015/0114745 A1* | 4/2015 | Naruoka | F02M 35/14 180/219 |
| 2015/0136511 A1* | 5/2015 | Kawata | B60K 13/02 180/219 |
| 2016/0040637 A1* | 2/2016 | Tsubone | B62K 11/04 180/225 |
| 2017/0015382 A1* | 1/2017 | Takakuwa | B62K 11/04 |
| 2017/0057583 A1* | 3/2017 | Yokoyama | B62K 5/027 |
| 2017/0089308 A1* | 3/2017 | Yamashita | B60K 13/02 |

* cited by examiner

MANUFACTURING METHOD OF HEAD BOX OF MOTORCYCLE, AND AIR-INTAKE DEVICE OF MOTORCYCLE

BACKGROUND OF THE INVENTION

Field of the Invention

The present invention relates to a manufacturing method of a head box of a motorcycle, and an air-intake device of the motorcycle.

Description of Related Art

An exemplary motorcycle is provided with a resonator structure for reducing an air-intake noise in a head box containing a head pipe therein (see e.g., Japanese Patent Publication No. 4490203). In the head box disclosed in Patent Literature 1, a separating wall is provided between a hollow branch portion to which a main frame is connected and an air-intake passage is formed with a communication hole for allowing the inner space of the main frame to function as a resonator.

However, the communication hole is formed by cutting the separating wall after the separating wall is molded. For this reason, the head box has a structure in which the whole of the communication hole is exposed when a vehicle body is viewed from a side. In some cases, the motorcycle is required to have a vehicle body frame structure which can improve the stiffness of the head box while reducing the air-intake noise.

The present invention addresses the above-described conditions, and an object of the present invention is to provide a motorcycle which has a structure which can improve the stiffness of the head box while reducing the air-intake noise.

SUMMARY OF THE INVENTION

According to an aspect of the present invention, there is provided a method of manufacturing a head box of a motorcycle, the head box including: a front opening to which an air-intake duct for taking in air to be supplied to an air cleaner is connected; a rear opening to which an inlet of the air cleaner is connected; a casing section which extends between the front opening and the rear opening, and is formed with a main air passage through which the air flows; and a pair of right and left extending sections which extend from the casing section to right and left, respectively, and are coupled to a pair of right and left main frames, respectively, wherein at least one of the pair of right and left extending sections is provided with a branch air passage which branches from the main air passage, and wherein a separating wall is provided between the main air passage and the branch air passage and has a communication hole via which the main air passage and the branch air passage are in communication with each other, the method comprising the steps of: molding the head box including the communication hole formed by use of a convex portion of one of a set of forming dies of a plurality of forming dies used to mold the separating wall; and after the step of molding the head box, separating the plurality of forming dies into pieces and taking out the head box which is a molded product.

In accordance with this configuration, since one of the set of forming dies used to mold the separating wall includes the convex (protruding) portion used to form the communication hole, the number of work steps can be reduced as compared to a case where the communication hole is formed by cutting the separating wall after the separating wall is molded. In addition, since the forming dies are separated into small pieces, for example, sand mold dies are broken into small pieces, after the head box is molded, the communication hole can be formed without considering drafts of the forming dies. In this way, the head box can be molded more flexibly. Therefore, it becomes possible to easily mold a structure for improving the stiffness of the head box while reducing an air-intake noise.

According to another aspect of the present invention, there is provided an air-intake device of a motorcycle, comprising: a vehicle body frame including: a hollow head box; and a pair of right and left main frames extending rearward from the head box and coupled to a right portion and a left portion of the head box, respectively, wherein the head box includes: a front opening to which an air-intake duct for taking in air to be supplied to an air cleaner is connected; a rear opening to which an inlet of the air cleaner is connected; a casing section which extends between the front opening and the rear opening and is formed with a main air passage through which the air flows; and a pair of right and left extending sections which extend from the casing section to right and left, respectively, and are coupled to the pair of right and left main frames, respectively, wherein at least one of the pair of right and left extending sections is provided with a branch air passage which branches from the main air passage, and wherein a separating wall is provided between the main air passage and the branch air passage and has a communication hole via which the main air passage and the branch air passage are in communication with each other, and wherein when a vehicle body is viewed from a side, at least one of the pair of right and left extending sections is extended rearward to a location at which at least a front region of the communication hole is covered by the extending section, externally in a vehicle width direction.

In accordance with this configuration, since the extending section is extended to a location at which at least the front end portion of the communication hole is covered by the extending section, externally in the vehicle width direction, it becomes possible to shift a location at which the head box and the main frame are joined together to a more rearward location. In this structure, the separating wall and the extending section can easily make a substantially box shape. Therefore, the stiffness of the head box can be easily improved. As a result, the air-intake noise can be reduced by providing the communication hole, and the stiffness of the head box can be improved.

DETAILED DESCRIPTION OF THE PREFERRED EMBODIMENTS

Hereinafter, the embodiments of the present invention will be described with reference to the accompanying drawings. Throughout the drawings, the same or corresponding components are designated by the same reference symbols and will not be described repeatedly. The directions stated below are from the perspective of a rider straddling a motorcycle.

Embodiment 1

Figure 1:
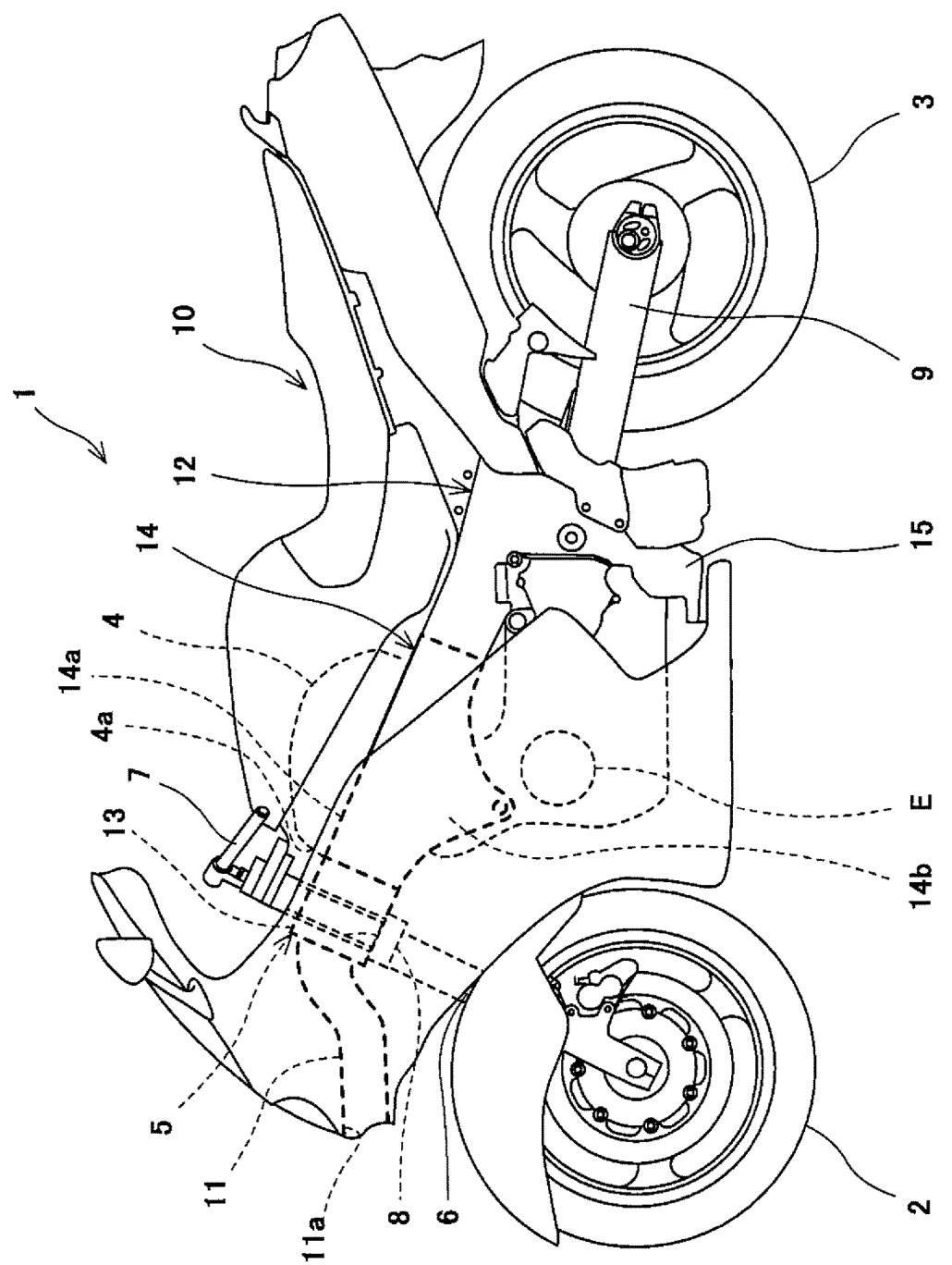
FIG. 1 is a left side view of a motorcycle including an air-intake device according to Embodiment 1.

FIG. 1 is a left side view of a motorcycle 1 including an air-intake device 5 according to Embodiment 1. Referring now to FIG. 1, the motorcycle 1 includes a front wheel 2, a rear wheel 3, an engine E, and the air-intake device 5. The front wheel 2 is rotatably coupled to the lower end portion of a front fork 6 extending substantially vertically. A handle 7 extending in a rightward and leftward direction is mounted to the upper end portion of the front fork 6 via a steering shaft 8. The rear wheel 3 is mounted to a vehicle body frame 12 via a swing arm 9. The engine E is placed between the front wheel 2 and the rear wheel 3. An air cleaner 4 is coupled to the engine E via a throttle body (not shown). The air-intake device 5 is coupled to the air cleaner 4 and takes in air to be supplied to the engine E. The air taken in by the air-intake device 5 is filtered by an air cleaner element (not shown) provided inside the air cleaner 4, and as a result, clean air is supplied to the engine E.

Figure 2:
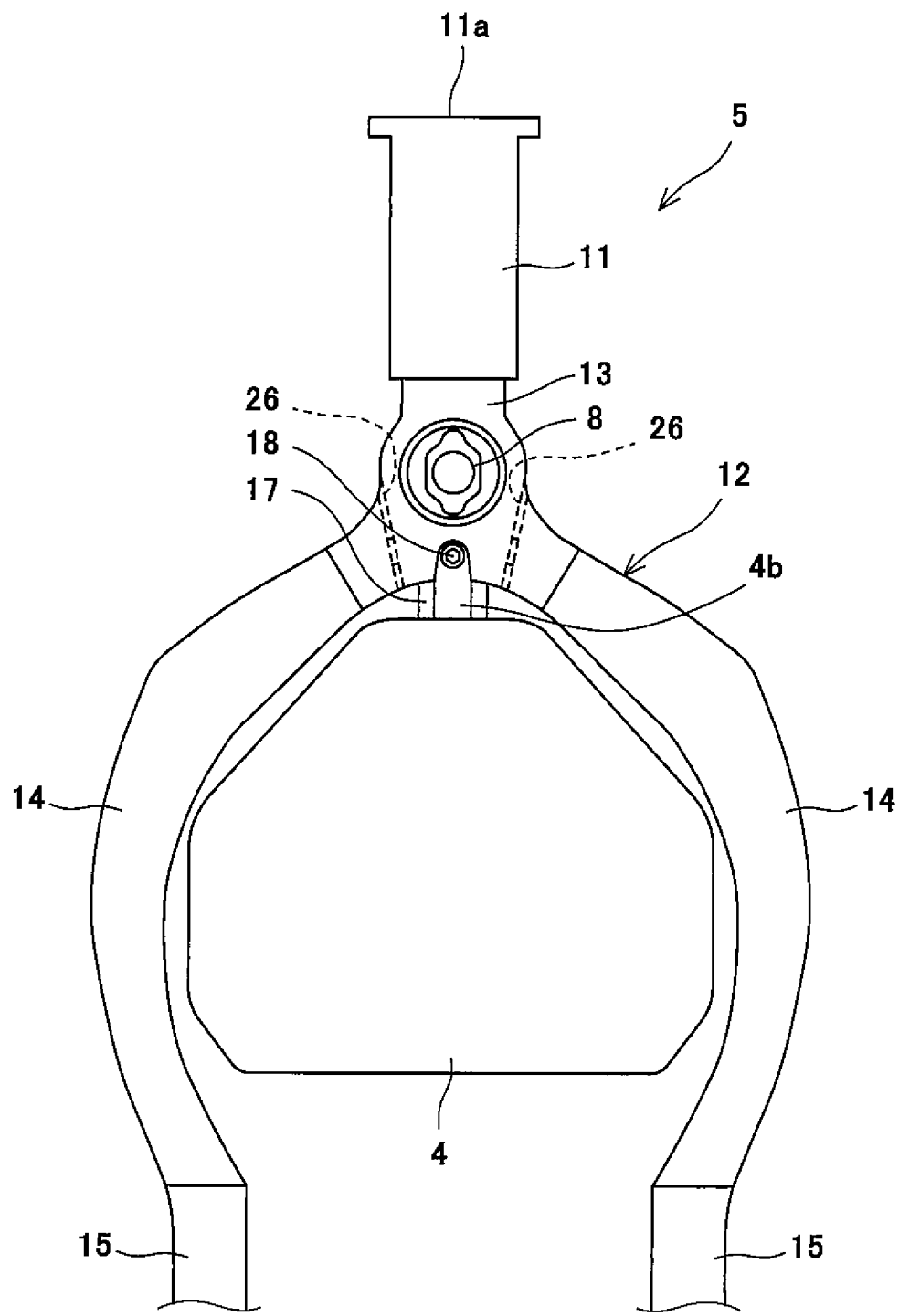
FIG. 2 is a plan view of the air-intake device of FIG. 1.

FIG. 2 is a plan view of the air-intake device 5 of FIG. 1. As shown in FIGS. 1 and 2, the air-intake device 5 includes an air-intake duct 11, and the vehicle body frame 12 to which the air-intake duct 11 is coupled. The air-intake duct 11 is coupled to the front end of the vehicle body frame 12, and extends forward. An air inlet 11a which opens forward is provided at the tip end of the air-intake duct 11. The air-intake duct 11 takes in, through the air inlet 11a, air flowing from the front as the air to be supplied to the air cleaner 4.

The vehicle body frame 12 is formed from a metal material such as an aluminum alloy. The vehicle body frame 12 includes a head box 13, and a pair of right and left main frames 14. The head box 13 extends in a forward and rearward direction. The head box 13 is a member having a substantially-Y shape when viewed from above, in which the rear portion of the head box 13 branches into right and left parts. The head box 13 is symmetric in a vehicle width direction (rightward and leftward direction) of a vehicle body 10 of the motorcycle 1, with respect to the center line of the vehicle body 10 in the vehicle width direction. The head box 13 has a hollow structure and includes an air-intake passage through which the air taken in by the air-intake duct 11 is guided to the air cleaner 4. The pair of right and left main frames 14 extend rearward from the head box 13. The main frames 14 have a hollow structure from front ends thereof to rear ends thereof.

Figure 3:
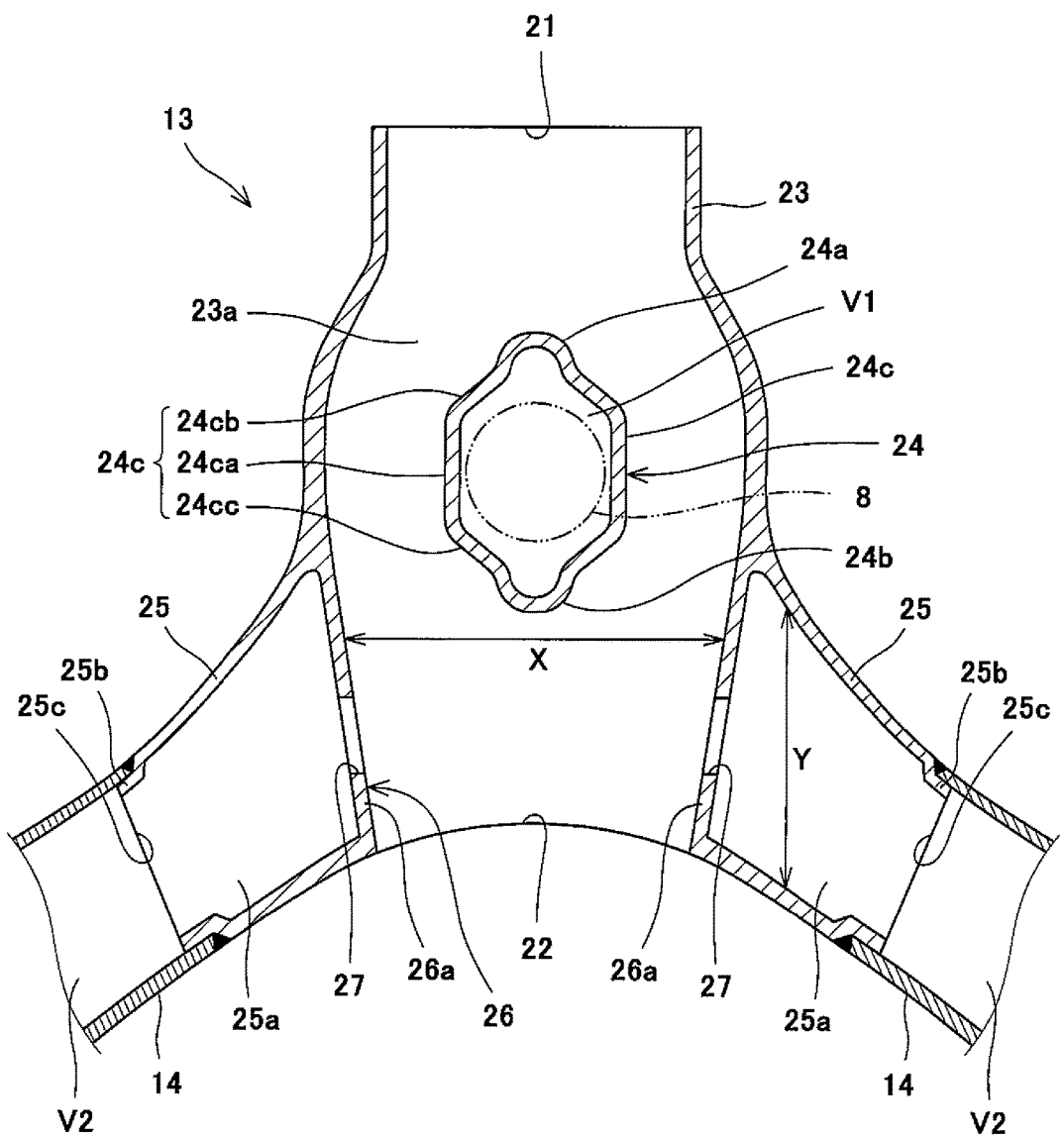
FIG. 3 is a horizontal sectional view of the head box of FIG. 2.
Figure 4:
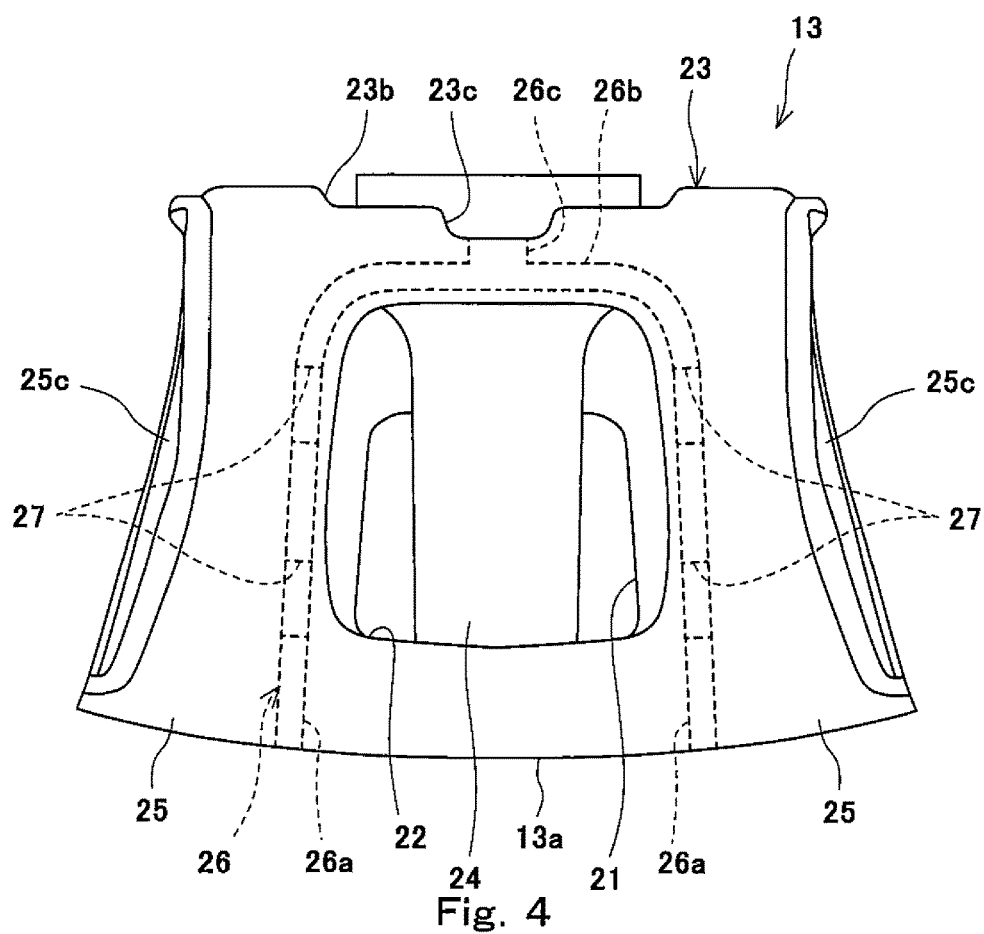
FIG. 4 is a rear view of the head box of FIG. 2.
Figure 5:
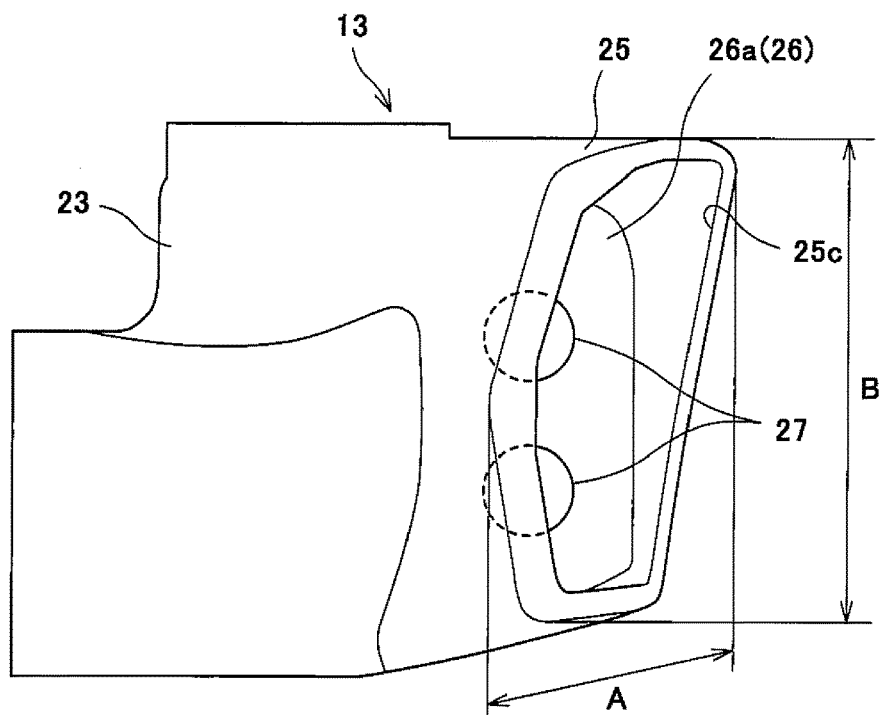
FIG. 5 is a left side view of the head box of FIG. 2.

FIG. 3 is a horizontal sectional view of the head box 13 of FIG. 2. FIG. 4 is a rear view of the head box 13 of FIG. 2. FIG. 5 is a left side view of the head box 13 of FIG. 2. As shown in FIGS. 2 to 5, the head box 13 includes a front opening 21, a rear opening 22, a casing section 23, a tubular wall section 24, and a pair of right and left extending sections 25. The rear end of the air-intake duct 11 is connected to the front opening 21. An inlet 4a of the air cleaner 4 is connected to the rear opening 22 via a duct 17. The inlet 4a is an air introduction port through which the air is taken into the air cleaner 4.

The casing section 23 extends in the forward and rearward direction along the center of the vehicle body 10 in the vehicle width direction to connect the front opening 21 and the rear opening 22 to each other. The casing section 23 has a shape in which the dimension in the vehicle width direction of a region which is rearward relative to the steering shaft 8 gradually decreases as this region extends rearward. The casing section 23 has a main air passage 23a through which the air from the air-intake duct 11 flows. The main air passage 23a extends in the forward and rearward direction between the front opening 21 and the rear opening 22. At least a rear region of the main air passage 23a has a dimension that decreases as this region extends rearward. Specifically, as shown in FIG. 3, in the region of the main air passage 23a which is rearward relative to the steering shaft 8, a dimension X of the main air passage 23a in the rightward and leftward direction decreases as this region extends rearward. An upper wall portion 23b of the casing section 23 is formed with a boss 23c by which the air cleaner 4 is fastened to the casing section 23. A plate-shaped fastening member 4b provided at the front end of the air cleaner 4 is fastened to the boss 23c by use of a fastener member (e.g., bolt) 18.

The casing section 23 has a hollow space V1 substantially at a center region in the forward and rearward direction. The steering shaft 8 is vertically inserted into the hollow space V1. The tubular wall section 24 surrounds the hollow space V1. The tubular wall section 24 extends upward from the bottom wall of the casing section 23. The tubular wall section 24 includes a pair of front and rear circular-arc wall portions 24a, 24b provided at front and rear sides of the steering shaft 8, respectively, and a pair of right and left connection wall portions 24c, each of which connects the right end portions or left end portions of the pair of front and rear circular-arc wall portions 24a, 24b. The pair of front and rear circular-arc wall portions 24a, 24b are provided substantially at the center region of the main air passage 23a in the rightward and leftward direction. The front circular-arc wall portion 24a protrudes farther forward than the connection wall portions 24c do, while the rear circular-arc wall portion 24b protrudes farther rearward than the connection wall portions 24c do. In brief, the tubular wall section 24 includes the protruding portion 24a protruding forward and the protruding portion 24b protruding rearward.

The pair of right and left connection wall portions 24c protrude farther outward in the vehicle width direction than the pair of front and rear circular-arc wall portions 24a, 24b do. The pair of right and left connection wall portions 24c include linear portions 24ca, respectively, which extend in the forward and rearward direction between the pair of front and rear circular-arc wall portions 24a, 24b, and are provided on the right and left sides of the steering shaft 8, a pair of inclined portions 24cb extending to be inclined from the front end portions of the linear portions 24ca to the right and left end portions of the front circular-arc wall portion 24a, and a pair of inclined portions 24cc extending to be inclined from the rear end portions of the linear portions 24ca to the right and left end portions of the rear circular-arc wall portion 24b. The air flowing through the main air passage 23a is guided by the tubular wall section 24 to the rear opening 22. More specifically, the air is guided by the front circular-arc wall portion 24a, the inclined portions 24cb, and the linear portions 24ca in such a manner that the air flows to be divided into airflow components moving through regions which are on the right and left sides of the steering shaft 8. Then, the air is guided by the inclined portions 24cc and the rear circular-arc portion 24b to the rear opening 22 in such a manner the airflow components merge into one airflow, at a location that is rearward relative to the steering shaft 8.

The pair of right and left extending sections 25 extend from the rear portion of the casing section 23 to the pair of right and left main frames 14, respectively. The pair of right and left extending sections 25 include a pair of right and left branch air passages 25a, respectively, which branch from the main air passage 23a. Each of the extending sections 25 has a shape in which a vertical dimension B is greater than a dimension A in the forward and rearward direction, in a cross-section taken in a direction perpendicular to a direction in which the branch air passage 25a extends. In other words, in the present embodiment, each of the extending sections 25 has a vertical section of a substantially rectangular shape which is vertically elongated (the lengthwise direction of the vertical section of the extending section 25 conforms to the vertical direction). The branch air passages 25a are inner spaces of the extending sections 25, which are in communication with inner spaces V2 of the main frames 14, respectively. As each of the extending sections 25 becomes closer to the corresponding main frame 14, the dimension Y of the branch air passage 25a in the forward and rearward direction decreases.

A tip end portion 25b of each of the extending sections 25 is formed with an opening 25c via which the corresponding branch air passage 25a and the inner space V2 of the corresponding main frame 14 are in communication with each other. The tip end portion 25b of each of the extending sections 25 has a stepped shape. In a state in which the tip end portion 25b is fitted into the opening formed at the front end portion of the main frame 14, the tip end portion 25b is joined to the front end portion of the main frame 14 by welding. The area of the opening of tip end portion 25b of the extending section 25 is set to be smaller than that of the opening of the front end portion of the main frame 14. Between the main air passage 23a and the branch air passages 25a, a separating wall 26 is provided.

As shown in FIGS. 3 and 4, the separating wall 26 has a dome shape. The separating wall 26 includes a pair of right and left side wall portions 26a extending upward from a bottom surface 13a of the head box 13, and an upper wall portion 26b coupling the pair of right and left side wall portions 26a to each other in the rightward and leftward direction. The pair of right and left side wall portions 26a are provided on the right and left sides of the rear opening 22 and define the right and left sides of the rear portion of the main air passage 23a. The pair of right and left side wall portions 26a become close to each other as the side wall portions 26a extend rearward. Each of the side wall portions 26a connects the front and rear of the base end portion of the extending section 25 to each other. The front end of each of the side wall portions 26a overlaps with the rear end of the tubular wall section 24 in the forward and rearward direction. The upper wall portion 26b extends in the rightward and leftward direction at a location that is rearward relative to the tubular wall section 24 and defines the upper portion of the main air passage 23a. The upper wall portion 26b of the separating wall 26 vertically faces the lower surface of the upper wall portion 23b, of the inner surface of the head box 13. The upper wall portion 26b of the separating wall 26 is coupled to the upper wall portion 23b of the head box 13 via a coupling portion 26c.

As shown in FIGS. 3 to 5, the separating wall 26 is formed with a plurality of communication holes 27 via which the main air passage 23a is in communication with the branch air passages 25a. In the present embodiment, each of the pair of right and left side wall portions 26a of the separating wall 26 is formed with two communication holes 27. The two communication holes 27 are circular holes, respectively, and have an equal size. Each of the two communication holes 27 is located to be deviated from the vertical center of the side wall portion 26a. The opening area of each of the communication holes 27 is set to be smaller than that of the rear opening 22. The communication holes 27 are located rearward relative to the tubular wall section 24 and the center of the side wall portion 26a in the forward and rearward direction.

When viewed from the vehicle width direction, at least a portion of each of the communication holes 27 is covered by the extending section 25. In the present embodiment, when the vehicle body 10 is viewed from the side, the front and center regions of each of the communication holes 27 are covered by the extending section 25, externally in the vehicle width direction. The front region of each of the communication holes 27 is covered by the rear end portion of the extending section 25, externally in the vehicle width direction. On the other hand, the rear region of each of the communication holes 27 is exposed (not covered by the extending section 25, externally in the vehicle width direction). Each of the communication holes 27 penetrates the separating wall 26 in the vehicle width direction. In the present embodiment, when the vehicle body 10 is viewed from the side, the center region of each of the communication holes 27 in the forward and rearward direction is covered by the extending section 25. When viewed in the vehicle width direction, a virtual plane formed by extending the contour of the communication hole 27 in the axial direction of the communication hole 27 overlaps with the extending section 25. The head box 13 is a molded product in which the communication holes 27 and the separating wall 26 are molded together by sand mold casting.

Figure 6:
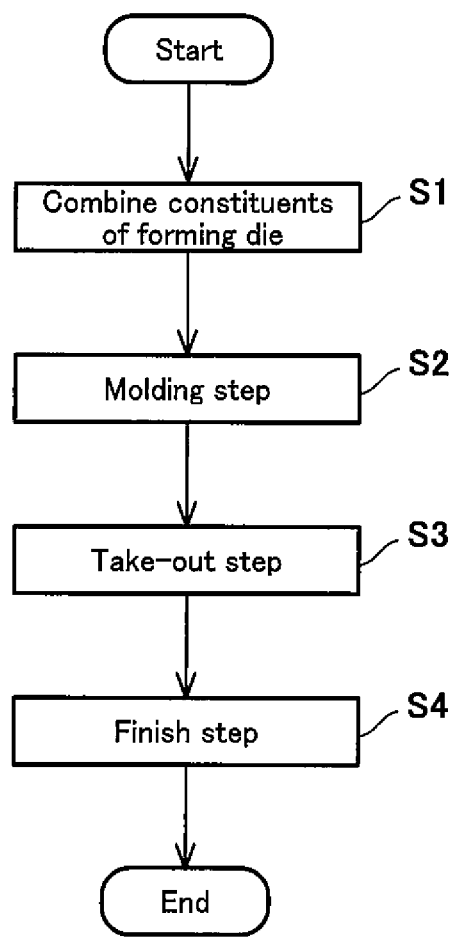
FIG. 6 is a flowchart showing the manufacturing steps of the head box of FIG. 2.
Figure 7:
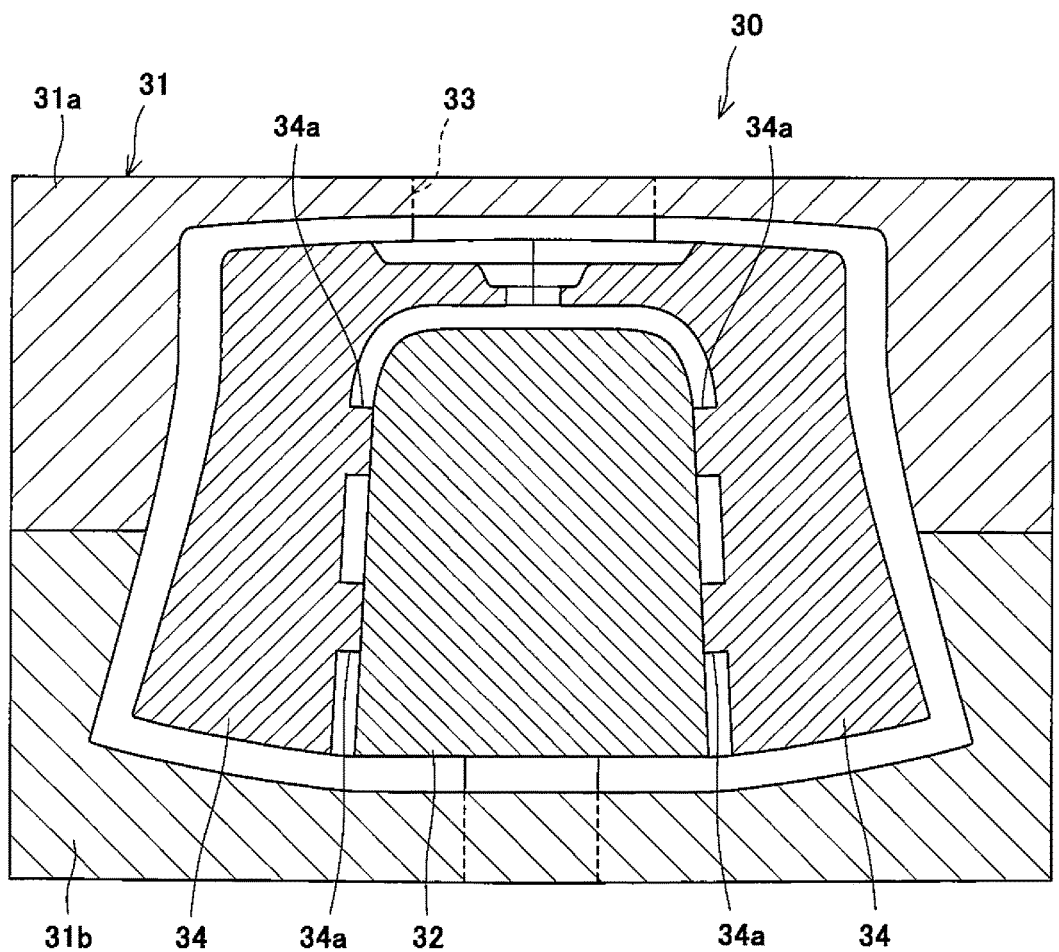
FIG. 7 is a cross-sectional view showing the constituents of a forming die used to mold the head box of FIG. 2.

FIG. 6 is a flowchart showing the manufacturing steps of the head box 13 of FIG. 2. FIG. 7 is a cross-sectional view showing the constituents of a forming die 30 used to mold the head box 13 of FIG. 2. Hereinafter, with reference to FIGS. 6 and 7, the manufacturing steps of the head box 13 will be described. The forming die 30 includes a main die 31 and a plurality of cores 32 to 34 (first to third cores 32 to 34). The main die 31 includes an upper die 31a and a lower die 31b. Initially, the constituents of the forming die 30 are combined in such a manner that the cores 32 to 34 are incorporated into the main die 31 (step S1). After that, a molding step of molding the head box 13 is performed in such a manner that molten metal (in the present embodiment, an aluminum alloy) is poured into the forming die 30 through a pouring gate provided on the upper die 31a, and then solidified (step S2).

The first core 32 is a forming die used to form the main air passage 23a and extends in the forward and rearward direction. The second core 33 is a forming die used to form the hollow space V1 of the casing section 23 and vertically penetrates the first core 32. The pair of right and left third cores 34 are extending section forming dies used to form the pair of right and left branch air passages 25a, respectively, and are provided on the right and left sides of the first core 32. The pair of right and left third cores 34 are coupled to each other by an adhesive in the molding step. The first core 32 and the third cores 34 are referred to as a plurality of separating wall forming dies used to mold the separating wall 26 (and the main air passage 23a). In the present embodiment, each of the third cores 34 includes a plurality of convex portions 34a used to form the communication holes 27, respectively. The convex portions 34a protrude from each of the third cores 34 toward the first core 32. The dimension of the protruding portions of the convex portions 34a is set to be smaller than the dimension of the coupling portion 26c (see FIG. 4) in the rightward and leftward direction. The third cores 34 and the first core 32 are combined in such a manner that the convex portions 34a of the third cores 34 are in contact with the right and left side surfaces of the first core 32. In the molding step, the molten metal is poured into spaces formed between the first core 32 and the third cores 34, and thus the separating wall 26 is molded.

After the molding step, a take-out step is performed to take the head box 13 out of the forming die 30 in such a manner that the cores 32 to 34 are broken into small pieces, for example, by utilizing an ultrasonic vibration generated by a vibration device, and then the sand is removed (step S3). Although in the present embodiment, the cores 32 to 34 are the sand mold dies which are made of the sand as a molding material, the cores 32 to 34 may be a plurality of metal dies which are separable from each other. Further, the cores 32 to 34 may be made of other materials. After taking the head box 13 out of the forming die 30, a finish step is performed (step S4).

The finish step includes the step of removing burrs formed on the outer surface of the separating wall 26 in the molding step, the step of removing the sand adhering to the surface of the head box 13, and the like. In the present embodiment, since the third cores 34 include the convex portions 34a, the burrs tend to be formed on the inner side surfaces of the side wall portions 26a in the vehicle width direction (the side surfaces facing the main air passage 23a in the vehicle width direction), of the outer surface of the separating wall 26. The burrs formed on the side wall portions 26a are removed by use of a deburring tool inserted through the rear opening 22 or the opening 25c. When the finish step ends, the manufacturing steps of the head box 13 is completed.

Figure 8:
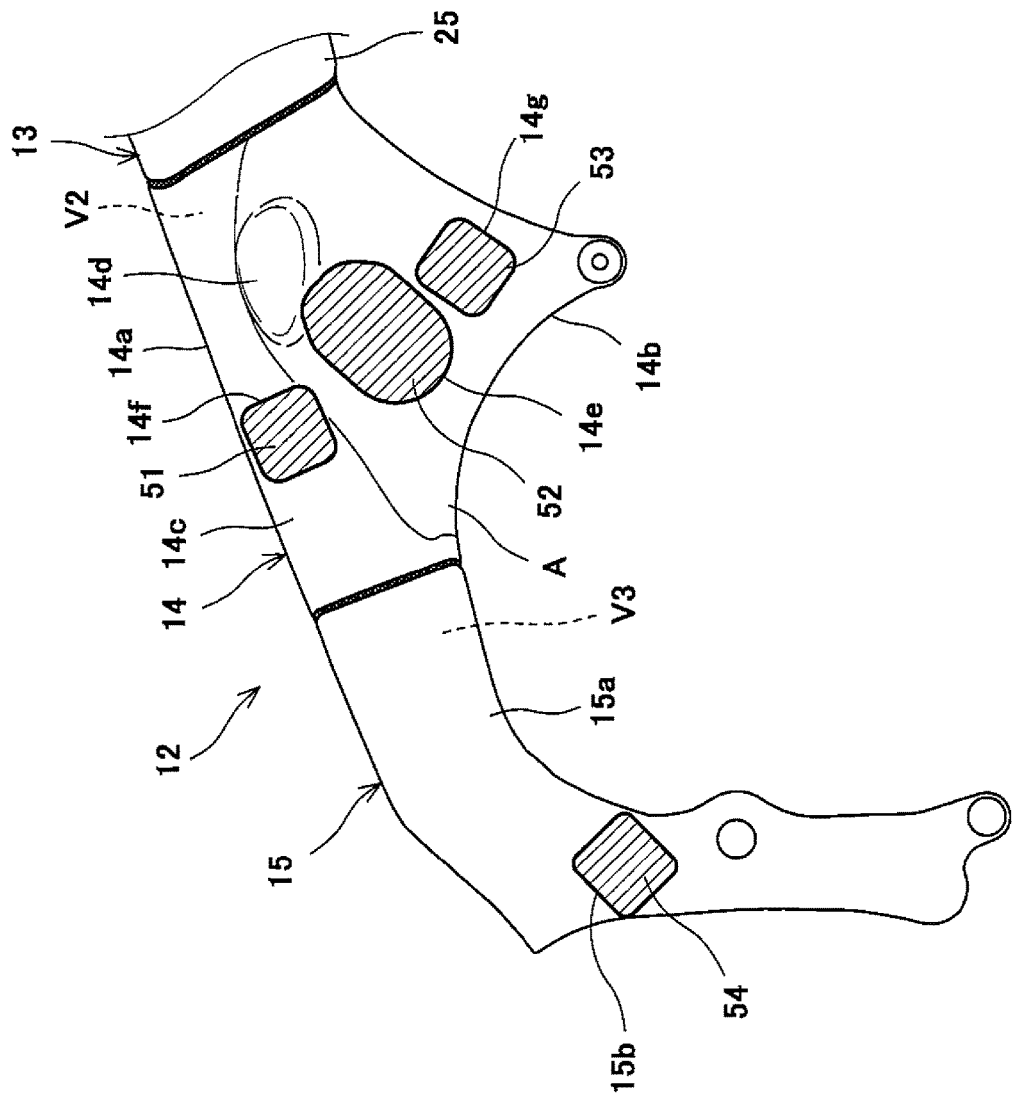
FIG. 8 is a side view showing a region which is in the vicinity of a main frame of FIG. 2, when a left side is viewed from the inside in a vehicle width direction of the vehicle body of the motorcycle.

FIG. 8 is a side view showing a region which is in the vicinity of the main frame 14 of FIG. 2, when a left side is viewed from the inside in the vehicle width direction. As shown in FIGS. 1 and 8, the main frame 14 includes a body member 14a which extends in the forward and rearward direction, and has a vertical dimension which is substantially equal to that of the extending section 25, and a hanger bracket member 14b of a substantially triangular shape, protruding downward from the lower end of the body member 14a. The main frame 14 has an inner side surface 14c in the vehicle width direction. A region A of the inner side surface 14c of the main frame 14 which faces the engine E in the vehicle width direction is recessed from the inside toward the outside in the vehicle width direction. The region A of the inner side surface 14c is formed with a recessed portion 14d of a substantially oval shape. The recessed portion 14d is recessed from the inside toward the outside in the vehicle with direction, to avoid interference with the engine E. The hanger bracket member 14b is integrated with the body member 14a and serves to support the engine E.

A pivot frame 15 is joined to the rear end of the main frame 14 by welding. The front end portion of a swing arm 9 is mounted to the pivot frame 15 in such a manner that the swing arm 9 is pivotable. The pivot frame 15 extends rearward from the rear end of the main frame 14 and then is bent downward. The pivot frame 15 has a hollow structure from its tip end toward its terminal end. An inner space V3 of the pivot frame 15 is in communication with the inner space V2 of the main frame 14.

A portion of the air flowing through the main air passage 23a flows through the communication holes 27 and then through the branch air passages 25a. Then, the air flows into the inner spaces V2 of the main frames 14 and the inner spaces V3 of the pivot frames 15. Each of the inner spaces V2 of the main frames 14 and the inner spaces V3 of the pivot frames 15 functions as a resonator (resonance chamber) for reducing an air-intake noise. The inner spaces V2 of the main frames 14 and the inner spaces V3 of the pivot frames 15 can dampen an air-intake pulsation and reduce the air-intake noise.

The main frames 14 and the pivot frames 15 are casted products, in which the inner spaces V2 and the inner spaces V3 are molded by the sand mold casting using the cores. The inner side surface 14c of each of the main frames 14 is formed with discharge holes 14e to 14g to discharge the cores left inside the inner space V2 after the main frame 14 is molded. An inner side surface 15a of the pivot frame 15 is formed with a discharge hole 15b to discharge the cores left inside the inner space V3 after the pivot frame 15 is molded.

The discharge holes 14e to 14g, 15b are provided below the inlet 4a of the air cleaner 4. The discharge hole 14e has a substantially oval shape. The discharge hole 14e is located in the vicinity of the recessed portion 14d in the inner side surface 14c. Specifically, the discharge hole 14e is formed in the inner side surface 14c in such a manner that the discharge hole 14e overlaps with the recessed portion 14d in the forward and rearward direction and in the vertical direction. The discharge holes 14f, 14g are provided on the upper and lower sides of the discharge hole 14e. The discharge holes 14f, 14g have a substantially square shape. The discharge holes 14f, 14g have an area smaller than that of the discharge hole 14e. The discharge hole 15b has a substantially square shape. The discharge hole 15b is provided substantially at a center portion in the lengthwise direction of the pivot frame 15. The discharge holes 14e to 14g, 15b are sealed by seal members 52, 51, 53, 54, respectively. For easier understanding of the description, in FIG. 7, the seal members 51 to 54 are hatched. The seal members 51 to 54 are, for example, seals made of a felt material which has a high seal performance with respect to an aluminum material. The seal members 52, 51, 53 are joined to flat portions formed around the discharge holes 14e, 14f, 14g, respectively, on the inner side surface 14c in such a manner that the seal members 52, 51, 53 are coplanar with the inner side surface 14c. The seal member 54 is joined to a flat portion formed around the discharge hole 15b on the inner side surface 15a in such a manner that the seal member 54 is coplanar with the inner side surface 15a.

The head box 13 configured as described above, and the air-intake device 5 including the vehicle body frame 12 including the head box 13 can obtain the following advantages.

When the vehicle body 10 is viewed from the side, each of the extending sections 25 is extended rearward to a location at which the front and center regions of the communication holes 27 are covered by the extending section 25, externally in the vehicle width direction. This makes it possible to shift a location at which the head box 13 and the main frame 14 are joined together to a more rearward location. In this structure, the separating wall 26 and the extending section 25 can easily make a substantially box shape. Therefore, the stiffness of the head box 13 can be easily improved. In a case where water flows into the main air passage 23a through the air-intake duct 11 and the front opening 21, it becomes possible to more effectively prevent a situation in which this water flows through the communication holes 27 and the branch air passage 25a and is accumulated in the inner space V2 of the main frame 14, as compared to a configuration in which the communication holes 27 are not covered by the extending section 5.

The separating wall 26 includes the pair of right and left side wall portions 26a extending upward from the bottom surface 13a of the head box 13, and the pair of right and left side wall portions 26a become closer to each other in the vehicle width direction, as they extend rearward. In this structure, when viewed from above, a shape defined by the two side wall portions 26a has a dimension that decreases as it extends rearward. Therefore, the stiffness of the head box 13 can be improved.

In the interior of the head box 13, the pair of right and left side wall portions 26a extend in the forward and rearward direction in such a manner that the front ends of the side wall portions 26a overlap with the rear end of the tubular wall section 24 in the forward and rearward direction. In this structure, the stiffness of a region which is in the vicinity of the tubular wall section 24 into which the steering shaft 8 is inserted can be easily improved. The front ends of the side wall portions 26a formed with the communication holes 27 overlap with the rear end of the tubular wall section 24 in the forward and rearward direction. The communication holes 27 are formed by the casting in such a manner that the communication holes 27 are provided to be apart from each of the openings 25c in the interior of the head box 13. Therefore, the communication holes 27 can be easily formed by the casting, as compared to a case where the communication holes 27 are formed by cutting the side wall portion 26a through the opening 25c.

The communication holes 27 are provided at a location that is rearward relative to the tubular wall section 24 surrounding the hollow space V1 into which the steering shaft 8 is inserted. The communication holes 27 are provided in a region which is downstream of the tubular wall section 24 in the airflow direction and has an increased airflow passage. In addition, the opening area of each of the communication holes 27 is set to be smaller than that of the rear opening 22. In this structure, the air flowing through the main air passage 23a is easily guided to the rear opening 22. This can prevent reduction of air-intake efficiency which would occur due to the fact that the air flows through the communication holes 27.

Since each of the side wall portions 26a of the separating wall 26 is formed with the two communication holes 27, reduction of the stiffness of the head box 13 can be prevented as compared to a case where the separating wall 26 is formed with one communication hole having a greater opening area. Since the two communication holes 27 are located to be deviated from the vertical center of each of the side wall portions 26a, a wall portion is left at the vertical center portion of the side wall portion 26a. This can prevent reduction of the stiffness of the head box 13. Since the two communication holes 27 are arranged in the vertical direction in each of the side wall portions 26a, and the wall portion is left between the two communication holes 27, reduction of the stiffness of the head box 13 can be prevented, while obtaining the increased airflow passage, which is a sum of the opening areas of the two communication holes 27.

The tubular wall section 24 includes the protruding portion (front circular-arc wall portion) 24a protruding forward and the protruding portion (rear circular-arc wall portion) 24b protruding rearward, and the protruding portions 24a, 24b function as ribs to improve the stiffness of the head box 13. The pair of right and left connection wall portions 24c of the tubular wall section 24 protrude outward in the vehicle width direction more than the front and rear circular-arc wall portions 24a, 24b do. In this structure, the connection wall portions 24c function as the ribs to improve the stiffness of the head box 13.

Since the region which is downstream of the tubular wall section 24 in the airflow direction is formed as the main air passage 23a, the flow passage area of the air can be increased after the air flows through the tubular wall section 24. The effects of the resonator can be obtained in a state in which the flow velocity of the air is reduced in the interior of the head box 13. Further, since the airflow components merge into one airflow in the region which is downstream of the tubular wall section 24 in the airflow direction, the frequency of the air-intake noise can be easily adjusted.

The pivot frame 15 connected to the main frame 14 has a hollow structure. The inner space V3 of the pivot frame 15 is in communication with the inner space V2 of the main frame 14. The inner space V3 of the pivot frame 15 also functions as the resonator for reducing the air-intake noise. In this structure, since the volume of the resonator is increased, the air-intake pulsation can be suppressed more effectively, and the air-intake noise can be further reduced.

The inner side surface 14c of the main frame 14 is formed with the discharge holes 14e to 14g to discharge the cores (sand mold dies) left inside the inner space V2 after the inner space V2 is molded, while the side surface 15a of the pivot frame 15 is formed with the discharge hole 15b to discharge the cores left inside the inner space V3 after the inner space V3 is molded. The discharge holes 14e to 14g, 15b are sealed by the seal members 52, 51, 53, 54, respectively. In this structure, it becomes possible to prevent a situation in which the water flows through the discharge holes 14e to 14g, 15b and is accumulated in the inner space V2 of the main frame 14 and the inner space V3 of the pivot frame 15. In addition, it becomes possible to prevent a resonance generated in the main frame 14 and the pivot frame 15 which function as the resonator from leaking to an outside region through the discharge holes 14e to 14g, 15b.

Since the third cores 34 of a set of the cores 32, 34 used to mold the separating wall 26 include the convex portions 34a used to form the communication holes 27, the communication holes 27 can be formed concurrently in the molding step of the separating wall 26. Thus, the number of work steps can be reduced, as compared to a case where the communication holes 27 are formed by cutting the separating wall 26 after the separating wall 26 is molded. After the head box 13 is molded, the cores 32, 34 which are the sand mold dies are broken into small pieces. For this reason, the communication holes 27 can be formed without considering drafts of the forming dies. In this way, the head box 13 can be molded more flexibly. Therefore, a structure for improving the stiffness of the head box 13 can be easily molded, while reducing the air-intake noise. When viewed in the vehicle width direction, the virtual plane formed by extending the contour of the communication hole 27 in the axial direction overlaps with the extending section 25. If a cutting tool used to cut the separating wall 26 is disposed to be tilted with respect to the vehicle width direction in the interior of the extending section 25 to form the communication holes 27, the cutting tool contacts the extending section 25, so that it becomes difficult to cut the separating wall 26. In contrast, in the present embodiment, since the communication holes 27 are molded together with the separating wall 26 by use of the cores 32, 34, work efficiency can be improved.

In a case where the opening area of the tip end portion 25b of the extending section 25 is set to be smaller than that of the front end portion of the main frame 14, it is difficult to insert the cutting tool through the opening 25c of the extending section 25 to form the communication holes 27. In contrast, in the present embodiment, by molding the communication holes 27 together with the separating wall 26 by use of the cores 32, 34, the work efficiency can be improved.

Since the cores 32, 34 which are the sand mold dies are formed with the shapes and axes of the communication holes 27, the communication holes 27 can be designed more flexibly. For example, the axes of the communication holes 27 can be formed to be inclined in a forward direction as they extend in the outward direction of the vehicle width direction. In this configuration, the effects of the resonator can be maintained while suppressing the air from flowing through the communication holes 27. Further, the communication holes 27 can be formed to have a shape other than the circular shape. With the communication holes 27 having such a shape, also, the effects of the resonator can be maintained, while preventing reduction of the stiffness of the head box 13.

Since the third cores 34 including the convex portions 34a used to form the communication holes 27 are used to form the branch air passages 25a, the shape of the branch air passages 25a can be designed without considering the drafts of the forming dies, and the communication holes 27 can be designed more flexibly.

The pair of right and left third cores 34 used to form the branch air passages 25a are coupled to each other in the molding step. Therefore, the convex portions 34a used to form the communication holes 27 do not increase the size of the third cores 34.

The third cores 34 of the set of the cores 32, 34 used to mold the separating wall 26 include the convex portions 34a used to form the communication holes 27, and the convex portions 34a contact the side surfaces of the first core 32. Therefore, the locations at which the burrs are formed on the outer surface of the separating wall 26 (the side wall portions 26a of the separating wall 26) in the molding step can be set, and hence the finish step of removing the burrs (deburring) can be easily performed.

Since the communication holes 27 are molded by the sand mold casting and are provided in the separating wall 26 at a location that is rearward relative to the center of the separating wall 26 in the forward and rearward direction, a distance between the rear opening 22 or the extending sections 25 and the communication holes 27 can be reduced. In this configuration, the burrs formed on the surfaces of the separating wall 26, corresponding to the joint surfaces of the first core 32 and of the third cores 34, can be easily removed through the rear opening 22 or the openings 25c of the extending sections 25.

The region of the inner side surface 14c of the main frame 14 which faces the engine E in the vehicle width direction is recessed from the inside toward the outside in the vehicle width direction, and is formed with the recessed portion 14d. Because of this structure, the inner space V2 of the main frame 14 has a complex shape in which the dimension in the rightward and leftward direction is varied in the forward and rearward direction. In the present embodiment, since the inner side surface 14c of the main frame 14 is formed with the plurality of discharge holes 14e to 14g, the cores left in the inner space V2 of the main frame 14 after the main frame 14 is molded can be discharged through the plurality of discharge holes 14e to 14g, as well the front and rear openings of the main frame 14. This can reduce work time.

Since the discharge hole 14e of a substantially oval shape and with a great area is located in the vicinity of the recessed portion 14d in the inner side surface 14c of the main frame 14, the cores can be discharged through the discharge hole 14e, even from a region of the inner space V2 from which the cores are not easily discharged through the front and rear openings, because the dimension of this region in the rightward and leftward direction is small. As a result, the work time can be reduced.

Since the inner side surface 14c of the main frame 14 is formed with the plurality of discharge holes 14e to 14g, and the inner side surface 15a of the pivot frame 15 is formed with the discharge hole 15b, the external appearance of the motorcycle 1 can be improved. The discharge holes 14e to 14g, 15b are sealed by the seal members 52, 51, 53, 54, respectively. In this configuration, the volume of the inner space V2 of the main frame 14 and the volume of the inner space V3 of the pivot frame 15 are not reduced, and the inner space V2 of the main frame 14 and the inner space V3 of the pivot frame 15 can work as the resonator more effectively, as compared to a case where a sponge material is fitted to the discharge holes 14e to 14g, 15b.

Since discharge holes 14e to 14g, 15b are located below the inlet 4a of the air cleaner 4, the water is not guided to the inlet 4a of the air cleaner 4, even if the water flows into the inner space V2 of the main frame 14 through discharge holes 14e to 14g, or into the inner space V3 of the pivot frame 15 through the discharge hole 15b.

Although in the present embodiment, the pair of right and left third cores 34 used to mold the branch air passages 25a include the convex portions 34a used to form the communication holes 27, this configuration is merely exemplary. Alternatively, the first core 32 used to form the main air passage 23a may be provided with convex portions to easily remove the burrs adhering to the separating wall 26 through the opening 25c. Although in the present embodiment, the pair of right and left third cores 34 are provided to mold the branch air passages 25a, respectively, this configuration is merely exemplary. Alternatively, the pair of right and left branch air passages 25a may be molded by use of one core (forming die). Further, the main frame 14 and the pivot frame 15 may not have a hollow structure.

Although in the present embodiment, each of the extending sections 25 covers the front and center regions of the communication holes 27, externally in the vehicle width direction, each of the extending sections 25 may cover only the front regions of the communication holes 27, or the whole of the communication holes 27. In other words, it is sufficient that each of the extending sections 25 may be extended rearward from the casing section 23 to a location at which the extending section 25 covers at least the front regions of the communication holes 27, externally in the vehicle width direction. Although in the present embodiment, the branch air passages 25a are provided at the pair of right and left extending sections 25, respectively, this configuration is merely exemplary. Alternatively, the branch air passage(s) 25a may be provided at only one of the pair of right and left extending sections 25. In other words, in the air-intake device 5, the resonator structure may be provided only at one of the right and left sides.

Embodiment 2

An air-intake device 105 according to Embodiment 2 is configured in such a manner that the communication holes 27 are provided in the separating wall 26 at locations different from those of the air-intake device 5 according to Embodiment 1. Hereinafter, regarding the air-intake device 105 according to Embodiment 2, differences from the air-intake device 5 according to Embodiment 1 will be described.

Figure 9:
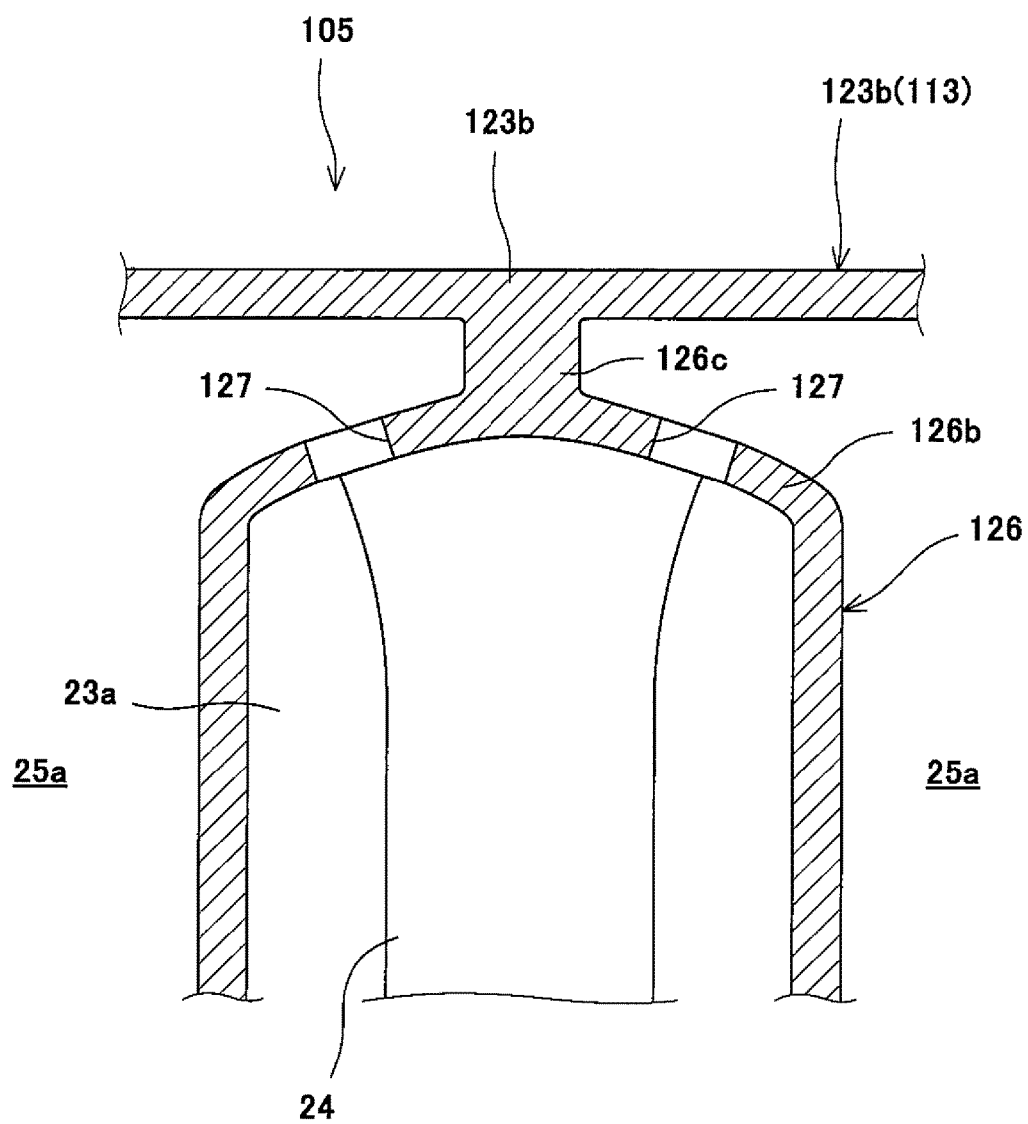
FIG. 9 is a cross-sectional view of the constituents of a head box of an air-intake device of a motorcycle according to Embodiment 2.

FIG. 9 is a cross-sectional view of the major components of a head box 113 of the air-intake device 105 according to Embodiment 2. As shown in FIG. 9, communication holes 127 are formed in an upper wall portion 126b of a separating wall 126. The communication holes 127 are provided on the right and left sides of a coupling portion 126c coupling the upper wall portion 126b of the separating wall 126 to an upper wall portion 123b of a casing section 123. A portion of the air flowing through the main air passage 23a flows through the communication holes 127 and then is guided to the branch air passages 25a through spaces formed between the upper wall portion 126b of the separating wall 126 and the upper wall portion 123b of the casing section 123. In other respects, the configuration of the air-intake device 105 according to Embodiment 2 is the same as that of the air-intake device 5 according to Embodiment 1.

In the above-described configuration, as in Embodiment 1, one of the set of the plurality of forming dies (cores) used to form the separating wall 126 includes the convex portions used to form communication holes 127. Therefore, the number of work steps can be reduced as compared to a case where the communication holes 127 are formed by cutting the separating wall 126 after the separating wall 126 is molded. After the head box 113 is molded, the forming dies are broken into small pieces. For this reason, the communication holes 127 can be formed without considering drafts of the forming dies. In this way, the head box 113 can be molded more flexibly. Therefore, it becomes possible to easily mold a structure for improving the stiffness of the head box 113 while reducing the air-intake noise.

Since the communication holes 127 are provided in the upper wall portion 126b of the separating wall 126 at locations opposite to a gravitational force with respect to the main air passage 23a, it becomes possible to prevent the water from flowing into the main air passage 23a through the communication holes 127, even if the water flows into the inner space V2 of the main frame 14 and is guided to the branch air passage 25a. Also, even when the water flows into the main air passage 23a, it becomes possible to prevent a situation in which the water flows through the communication holes 127 and the branch air passage 25a and is accumulated in the inner space V2 of the main frame 14.

The communication holes 127 are formed in the upper wall portion 126b of the separating wall 126 by the casting. In this structure, ribs connecting the side wall portions 126a to the inner surfaces of the extending sections 25 are more easily provided at the head box 113, and hence the stiffness of the head box 113 can be easily secured, as compared to a case where the communication holes 127 are formed by inserting the cutting tool into the branch air passage 25a through the opening 25c and cutting the side wall portion 126a.

Embodiment 3

An air-intake device 205 according to Embodiment 3 is configured in such a manner that a part of the configuration of the vehicle body frame 12 of the air-intake device 5 according to Embodiment 1 is changed. Hereinafter, regarding the air-intake device 205 according to Embodiment 3, differences from the air-intake device 5 according to Embodiment 1 will be described.

Figure 10:
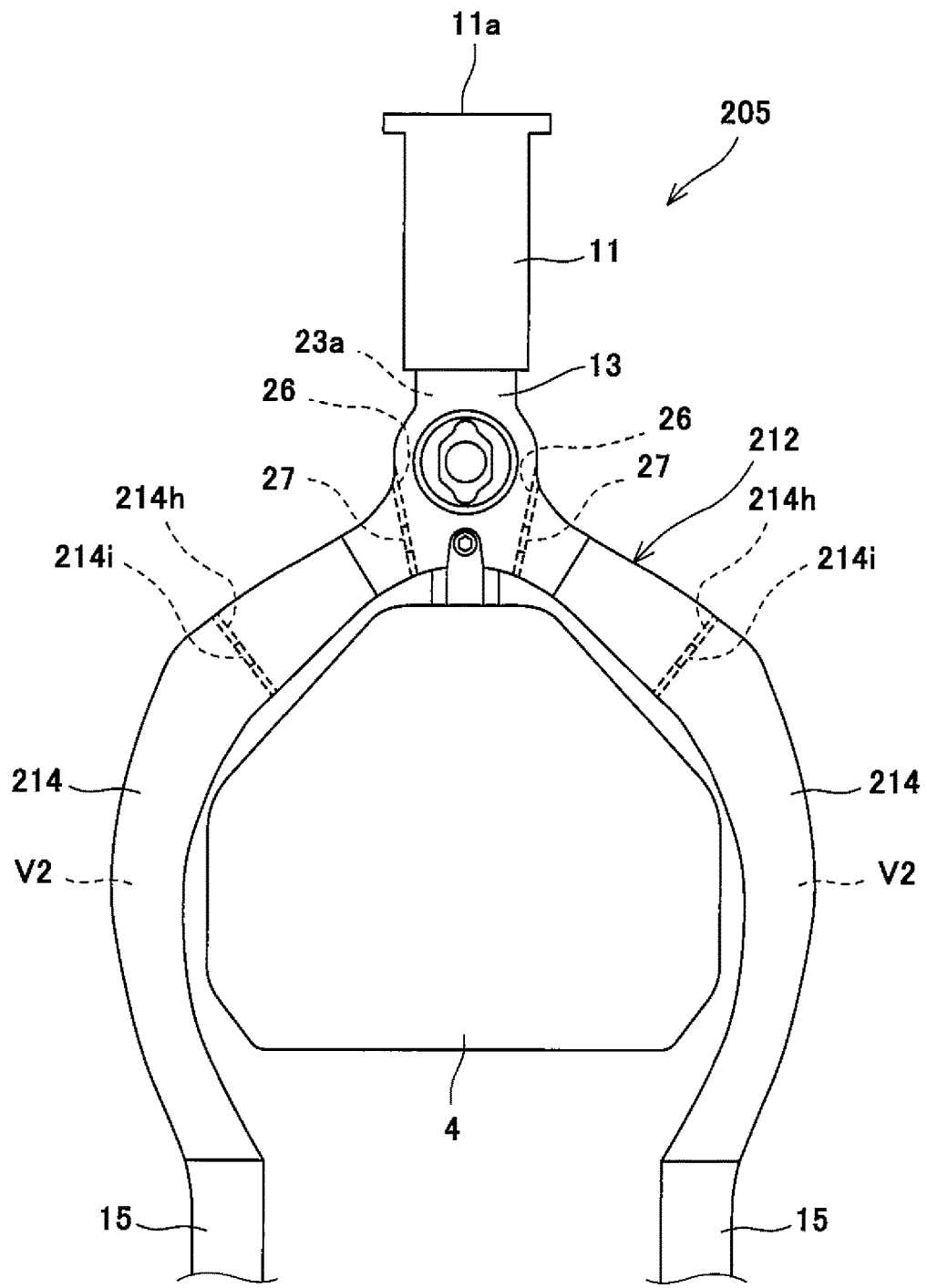
FIG. 10 is a view of an air-intake device of a motorcycle according to Embodiment 3, corresponding to FIG. 2.

FIG. 10 is a view of the air-intake device 205 according to Embodiment 3, corresponding to FIG. 2. As shown in FIG. 10, each of main frames 214 of a vehicle body frame 212 includes a rib 214h provided on an inner surface thereof. The rib 214h is a wall portion connecting the inner surface of the main frame 214 in the vertical direction and in the rightward and leftward direction. The rib 214h overlaps with the air cleaner 4 in the forward and rearward direction. More specifically, the rib 214h overlaps with a portion of the air cleaner 4 which is in front of the center portion in the forward and rearward direction. The rib 214h is formed with an airflow hole 214i through which the air flowing from the communication hole 27 flows. The airflow hole 214i is located substantially at the center portion of the rib 214h in the rightward and leftward direction. In other respects, the configuration of the air-intake device 205 according to Embodiment 3 is the same as that of the air-intake device 5 according to Embodiment 1.

In the above-described configuration, as in Embodiment 1, one of the set of the plurality of forming dies (cores) used to form the separating wall 26 includes the convex portions used to form the communication holes 27. Therefore, the number of work steps can be reduced as compared to a case where the communication holes 27 are formed by cutting the separating wall 26 after the separating wall 26 is molded. After the head box 13 is molded, the forming dies are broken into small pieces. For this reason, the communication holes 27 can be formed without considering drafts of the forming dies. In this way, the head box 13 can be molded more flexibly. Therefore, it becomes possible to easily form a structure for improving the stiffness of the head box 13 while reducing the air-intake noise.

In addition, a portion of the air flowing through the main air passage 23a flows through the communication holes 27 formed in the separating wall 26 of the head box 13 and then through the airflow hole 214i formed in the rib 214h of the main frame 214. In this structure, the air flows through the plurality of holes, and thus, the air-intake noise can be reduced more effectively. Further, the rib 214h formed with the airflow hole 214i overlaps in the forward and rearward direction, with a portion of the air cleaner 4 which is in front of the center portion in the forward and rearward direction of the air cleaner 4. In this structure, the airflow hole 214i is located in the vicinity of the head of the rider straddling the motorcycle 1, in the forward and rearward direction. As a result, the air-intake noise can be reduced more effectively for the rider.

Embodiment 4

An air-intake device 305 according to Embodiment 4 is configured in such a manner that the location of the communication hole 27 is made different from that of the air-intake device 5 according to Embodiment 1. Hereinafter, regarding the air-intake device 305 according to Embodiment 4, differences from the air-intake device 5 according to Embodiment 1 will be described.

Figure 11:
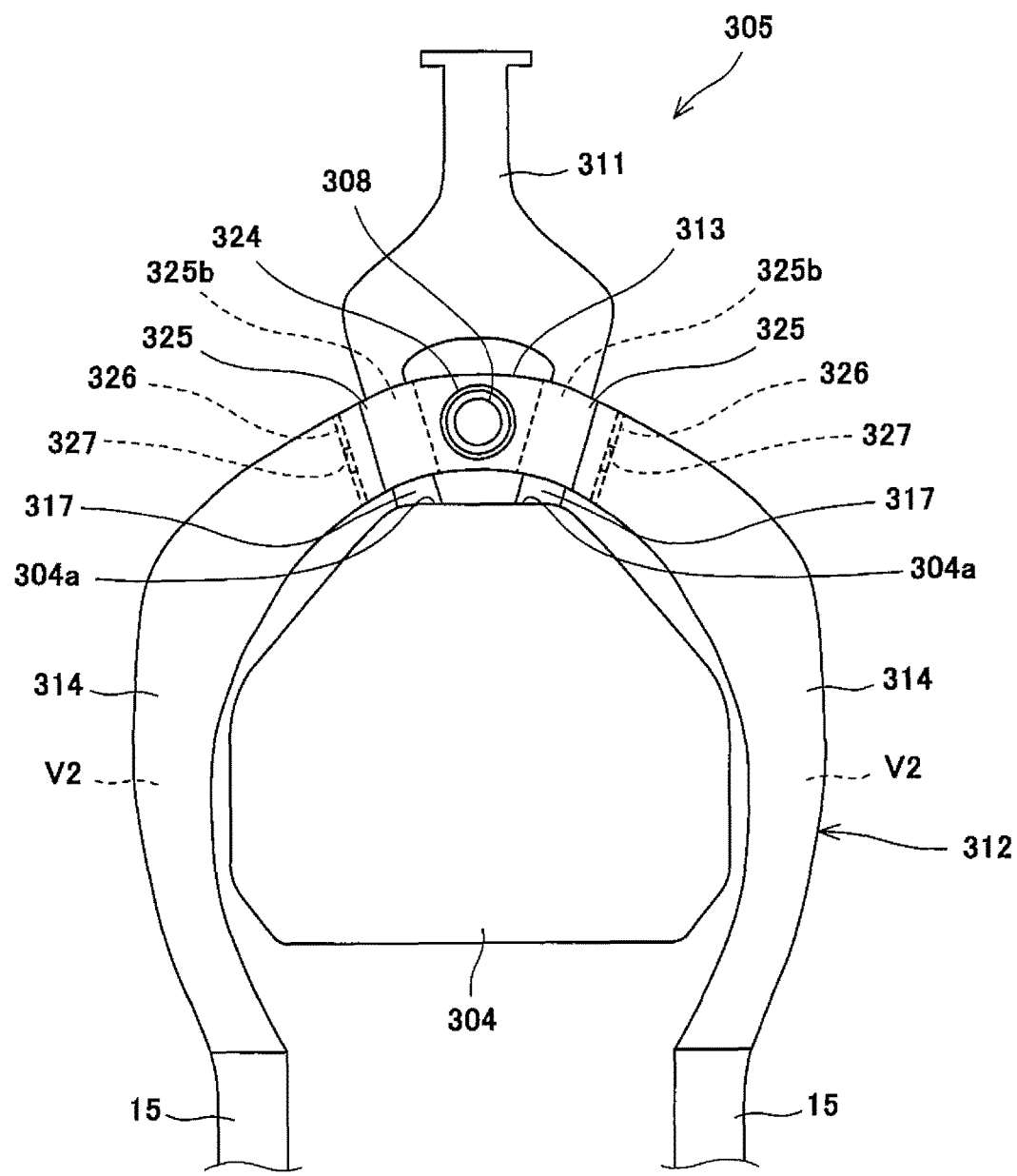
FIG. 11 is a view of an air-intake device of a motorcycle according to Embodiment 4, corresponding to FIG. 2.
Figure 12:
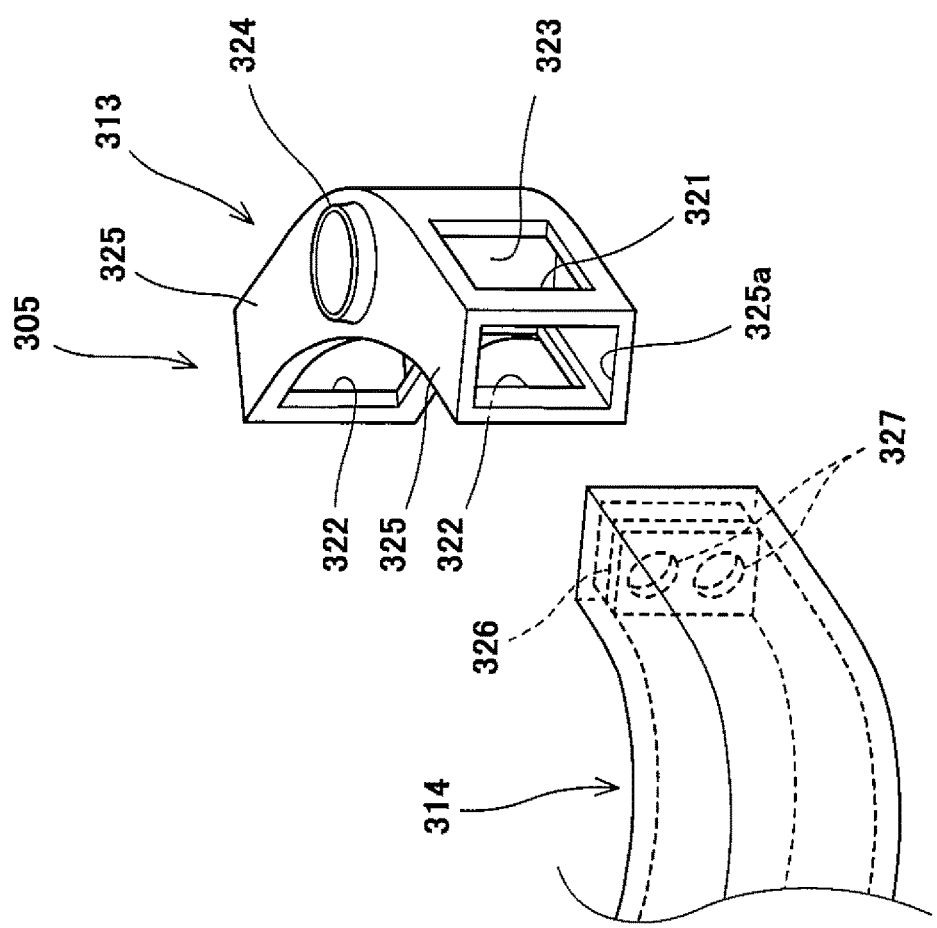
FIG. 12 is a perspective view of a head box and a main frame of FIG. 11.

FIG. 11 is a view of the air-intake device 305 according to Embodiment 4, corresponding to FIG. 2. FIG. 12 is a perspective view of a head box 313 and a main frame 314 of FIG. 11. As shown in FIGS. 11 and 12, the head box 313 includes a box body 323, and a pair of right and left extending sections 325. The box body 323 has a non-hollow structure, and contains therein a head pipe 324 into which a steering shaft 308 of a handle (not shown) is inserted. The pair of right and left extending sections 325 have a hollow structure. The pair of right and left extending sections 325 extend from the box body 323 to the right and the left, respectively, and are joined to the front ends of main frames 314 of a vehicle body frame 312, respectively.

Each of the pair of right and left extending sections 325 includes a front opening 321, and a rear opening 322. An air-intake duct 311 of a substantially Y-shape is coupled to the front openings 321. An inlet 304a of an air cleaner 304 is coupled to the rear openings 322 via ducts 317. Each of the extending sections 325 is formed with an air-intake passage 325b extending between the front opening 321 and the rear opening 322. The air flowing from the front flows to the air-intake passages 325b through the air-intake duct 311, and then is supplied to the air cleaner 304 through the ducts 317. It is sufficient that at least one of the pair of right and left extending sections 325 is provided with the air-intake passage 325b.

The air-intake passage 325b is in communication with an inner space V2 of the main frame 314 via an opening 325a formed at the tip end of each of the extending sections 325. In this structure, a portion of the air flowing through the air-intake passage 325b flows into the inner space V2 of the main frame 314. In the interior of the inner space V2 of the main frame 314, a separating wall 326 formed with a plurality of communication holes 327 is provided.

The separating wall 326 is a wall portion connecting the inner surface of the main frame 314 in the vertical direction and in the rightward and leftward direction. The separating wall 326 also functions as a rib for securing the stiffness of the main frame 314. The separating wall 326 is provided at a location that is in the vicinity of and rearward relative to a location at which the main frame 314 and the extending section 325 are coupled to each other. More specifically, the separating wall 326 is provided in a region of the inner space V2 of the main frame 314, the region overlapping with the front end of the air cleaner 304 in the forward and rearward direction. The communication holes 327 are molded together with the separating wall 326 by the casting. Alternatively, the communication holes 327 may be formed by inserting the cutting tool into the main frame 314 through the front end opening of the main frame 314 and cutting the separating wall 326. In other respects, the configuration of the air-intake device 305 according to Embodiment 4 is the same as that of the air-intake device 5 according to Embodiment 1.

In accordance with the above-described configuration, since the box body 323 containing the head pipe 324 therein has the non-hollow structure, it is not necessary to provide a structure for securing the stiffness of the head box 313 in the interior of the box body 323, as compared to a case where the air-intake passage extends in the forward and rearward direction in the interior of the box body 323. Therefore, the stiffness of the head box 313 can be easily secured, and the head box 313 can be easily molded. Since the separating wall 326 formed with the communication holes 327 is provided in the main frame 314 at a location that is in the vicinity of a location at which the main frame 314 and the extending section 325 are coupled to each other, a dimension of the extending section 325 extending from the box body 323 can be reduced, and hence the size of the head box 313 can be reduced. As a result, in the air-intake device 305, the air-intake noise can be reduced by providing the communication holes 327, and the stiffness of the head box 313 can be improved.

Since the separating wall 326 is provided in the main frame 314 at a location that is in the vicinity of a location at which the main frame 314 and the extending section 325 are coupled to each other, the communication holes 327 for allowing the inner space V2 of the main frame 314 to function as the resonator are located in the vicinity of the head of the rider straddling the motorcycle 1, in the forward and rearward direction. In this configuration, the air-intake noise can be reduced more effectively for the rider.

The present invention is not limited to the above-described embodiments, and the configurations can be changed, added to or deleted within the scope of the invention. The above-described embodiments may be combined as desired. For example, a part of the configurations or processes of one embodiment may be applied to other embodiments. A part of the configurations of each of the embodiments can be separated from other configurations of the embodiment and can be extracted as desired. The number of communication holes 27 formed in the separating wall 26 and the number of communication holes 327 formed in the separating wall 326 may be set as desired. It is sufficient that at least one communication hole 27, 327 is formed. Although in the above-described embodiments, the plurality of communication holes 27 have the circular shape and an equal size and the plurality of communication holes 327 have the circular shape and an equal size, either the shape or the size may be made different between the plurality of communication holes 27, and either the shape or the size may be made different between the plurality of communication holes 327, in order to reduce the air-intake noise or set a resonant frequency at which the rider can comfortably hear the air-intake noise. The separating walls 26, 326 may be provided with ribs to improve the stiffness. Further, in order to prevent the water from flowing through the communication holes 27, 327, each of the separating walls 26, 326 may be integrally provided with a lid member for covering the communication holes 27, 327 in such a manner that the lid member faces the communication holes 27, 327 to be spaced apart at a predetermined distance from the communication holes 27, 327 in the air-intake direction.

The invention claimed is:

1. An air-intake device of a motorcycle, comprising:
   a vehicle body frame including:
      a hollow head box; and
      a pair of right and left main frames extending rearward from the head box and coupled to a right portion and a left portion of the head box, respectively,
   wherein the head box includes:
      a front opening to which an air-intake duct for taking in air to be supplied to an air cleaner is connected;
      a rear opening to which an inlet of the air cleaner is connected;
      a casing section which extends between the front opening and the rear opening and is formed with a main air passage through which the air flows; and
      a pair of right and left extending sections which extend from the casing section to right and left, respectively, and are coupled to the pair of right and left main frames, respectively,
   wherein at least one of the pair of right and left extending sections is provided with a branch air passage which branches from the main air passage,
   wherein a separating wall is provided between the main air passage and the branch air passage and has a communication hole via which the main air passage and the branch air passage are in communication with each other, wherein when a vehicle body is viewed from a side, at least one of the pair of right and left extending sections is extended rearward to a location at which at least a front region of the communication hole is covered by the extending section, externally in a vehicle width direction, wherein the separating wall includes a pair of right and left side wall portions which define right and left sides of a rear portion of the main air passage, and the communication hole is provided at each of the side wall portions, and wherein the pair of right and left side wall portions are made closer to each other as the pair of right and left side wall portions extend rearward, wherein the separating wall includes the pair of right and left side wall portions extending upward from a bottom surface of the head box, and an upper wall portion coupling the pair of right and left side wall portions to each other in a rightward and leftward direction, and wherein the head box includes an upper wall portion, and a coupling portion coupling the upper wall portion of the separating wall to the upper wall portion of the head box.

2. The air-intake device according to claim 1, wherein the at least one of the pair of right and left extending sections has a shape in which a dimension in a forward and rearward direction of an inner space of the extending section decreases as the extending section becomes closer to a corresponding one of the pair of right and left main frames.

3. The air-intake device according to claim 1, wherein the head box further includes a tubular wall section surrounding a hollow space into which a steering shaft of a handle is inserted, and wherein the communication hole is located rearward relative to the tubular wall section.

4. The air-intake device according to claim 3, wherein the head box includes a space where air flow components which flow through the main air passage merge into one air flow at a location that is rearward relative to the tubular wall section.

5. The air-intake device according to claim 1, wherein the head box is a molded product in which the communication hole is molded together with the separating wall.

6. The air-intake device according to claim 5, wherein the communication hole is molded by casting, and is provided in the separating wall at a location that is rearward relative to a center of the separating wall in a forward and rearward direction.

7. The air-intake device according to claim 1, wherein the pair of right and left side wall portions are coupled to a peripheral portion of the rear opening of the head box.

8. The air-intake device according to claim 1, wherein the right side wall portion connects front and rears of base end portion of the right extending section and the left side wall portion connects front and rears of base end portion of the left extending section.

9. The air-intake device according to claim 1, wherein the communication hole is located rearward relative to a center of the left and right side wall portions.

10. The air-intake device according to claim 1, wherein the extending section covers a center of the communication hole from outside in the vehicle width direction.

11. An air-intake device of a motorcycle, comprising:

a vehicle body frame including:

a hollow head box; and a pair of right and left main frames extending rearward from the head box and coupled to a right portion and a left portion of the head box, respectively, wherein the head box includes:

a front opening to which an air-intake duct for taking in air to be supplied to an air cleaner is connected;

a rear opening to which an inlet of the air cleaner is connected;

a casing section which extends between the front opening and the rear opening and is formed with a main air passage through which the air flows; and a pair of right and left extending sections which extend from the casing section to right and left, respectively, and are coupled to the pair of right and left main frames, respectively, wherein the pair of right and left extending sections is provided with a branch air passage which branches from the main air passage, wherein a separating wall is provided between the main air passage and the branch air passage and has a communication hole via which the main air passage and the branch air passage are in communication with each other, wherein the separating wall includes the pair of right and left side wall portions extending upward from a bottom surface of the head box, and an upper wall portion coupling the pair of right and left side wall portions to each other in a rightward and leftward direction, and wherein the head box includes an upper wall portion, and a coupling portion coupling the upper wall portion of the separating wall to the upper wall portion of the head box.

* * * * *